(12) United States Patent
Weston et al.

(10) Patent No.: US 10,099,201 B1
(45) Date of Patent: Oct. 16, 2018

(54) ZEOLITE AGGLOMERATES WITH A HALLOYSITE CLAY BINDER

(71) Applicant: ZEOCHEM LLC, Louisville, KY (US)

(72) Inventors: Kerry Weston, Cox's Creek, KY (US); Jim Palmore, Louisville, KY (US); Dave Jaussaud, Louisville, KY (US)

(73) Assignee: ZEOCHEM LLC, Louisville, KY (US)

( * ) Notice: Subject to any disclaimer, the term of this patent is extended or adjusted under 35 U.S.C. 154(b) by 134 days.

(21) Appl. No.: 15/016,965

(22) Filed: Feb. 5, 2016

Related U.S. Application Data (60) Provisional application No. 62/112,375, filed on Feb. 5, 2015.

(51) Int. Cl.
  *B01J 20/18* (2006.01)
  *B01J 20/12* (2006.01)
  *B01J 20/28* (2006.01)

(52) U.S. Cl.
  CPC ............... *B01J 20/18* (2013.01); *B01J 20/12* (2013.01); *B01J 20/28004* (2013.01); *B01J 20/28085* (2013.01)

(58) Field of Classification Search
  None
  See application file for complete search history.

(56) References Cited

U.S. PATENT DOCUMENTS

| | | | |
|---|---|---|---|
| 2,973,327 A | 2/1961 | Mitchell et al. | |
| 5,001,098 A | 3/1991 | Pacaud et al. | |
| 5,512,083 A | 4/1996 | Dunne | |
| 5,667,560 A | 9/1997 | Dunne | |
| 6,130,179 A | 10/2000 | Sampson et al. | |
| 6,410,815 B1 | 6/2002 | Plee et al. | |
| 6,425,940 B1 * | 7/2002 | Chao | B01D 53/02 502/75 |
| 6,743,745 B2 | 6/2004 | Jaussaud et al. | |
| 6,918,948 B2 | 7/2005 | Jaussaud et al. | |
| 8,283,274 B2 | 10/2012 | Cheng et al. | |
| 8,859,448 B2 | 10/2014 | Cheng et al. | |
| 2010/0196213 A1 * | 8/2010 | Lutz | B01J 20/183 422/120 |

OTHER PUBLICATIONS

Applied Minerals (Applications: Catalysts and Molecular Sieves, published at least by Aug. 21, 2013 as retrieved on https://web.archive.org/web/20130821234543/http://appliedminerals.com/applications/catalysts-and-molecular-sieves).*

Applied Minerals (Presentation: Dragonite Overview, published at least by Feb. 16, 2012 as retrieved on https://web.archive.org/web/20120216163552/http://appliedminerals.tempwebpage.com:80/images/uploads/Applied_Minerals-Dragonite_Overview.pdf).*

Bates, et al., "Morphology and Structure of Endellite and Halloysite", The American Mineralogist Journal of the Mineralogical Society of America, Jul.-Aug. 1950, vol. 35, Nos. 7-8, pp. 463-484.

* cited by examiner

*Primary Examiner* — Melvin C. Mayes
*Assistant Examiner* — Michael Forrest
(74) *Attorney, Agent, or Firm* — Scott R. Cox (57) ABSTRACT

A molecular sieve blend containing a zeolite, particularly a zeolite X or A, blended with a halloysite clay binder, wherein the binder contains at least 90% by weight halloysite clay, with a particle length less than about 1 µm and processes for the production and use of this blend, particularly for adsorption of water from a feedstream and for the production of oxygen.

18 Claims, 5 Drawing Sheets

FIGURE 1

Physical Characteristics

|  | Tapped Bulk Density (g/L) | H2O Capacity 50% RH and 20 °C (% w/w) | Crush Strength (N) | Average Particle Size, Φ (mm) |
|---|---|---|---|---|
| Comparative Example 1 | 764 | 21.4 | 36 | 2.24 |
| Inventive Example 2 | 849 | 21.1 | 42 | 1.90 |
| Comparative Example 3 | 761 | 22.5 | 34 | 2.20 |
| Inventive Example 4 | 809 | 24.3 | 33 | 2.00 |

FIGURE 2

Mercury Porosity and Pore Distribution

|  | Total Intrusion Volume (ml/g) | Median Pore Diameter (μm) | Total Porosity (%) |
|---|---|---|---|
| Comparative Example 1 | 0.307 | 0.190 | 32.8 |
| Inventive Example 2 | 0.186 | 0.089 | 21.8 |

FIGURE 3

Dynamic Water Adsorption Performance

|  | Packed Density Dynamic (g/L) | Breakthrough Time, $T_b$ (min) | Length of Unused Bed "LUB" (cm) | Particle Diameter, $\Phi$ (mm) | $H_2O$ Capacity Dynamic (% w/w) |
|---|---|---|---|---|---|
| Comparative Example 1 | 768 | 306 | 3.61 | 2.21 | 21.4 |
| Inventive Example 2 | 866 | 389 | 1.93 | 1.89 | 21.1 |
| Comparative Example 3 | 781 | 253 | 4.19 | 2.27 | 21.2 |
| Inventive Example 4 | 806 | 394 | 1.30 | 1.96 | 22.4 |

ZEOLITE AGGLOMERATES WITH A HALLOYSITE CLAY BINDER

CROSS-REFERENCE TO RELATED APPLICATION

This Application claims benefit of Provisional Application No. 62/112,375, filed on Feb. 5, 2015.

STATEMENT REGARDING FEDERALLY SPONSORED RESEARCH OR DEVELOPMENT

Not applicable.

BACKGROUND OF THE INVENTION

Various embodiments of the inventive concept comprise molecular sieve blends containing a combination of a zeolite with a halloysite clay binder. Various zeolites can be utilized in the preparation of the molecular sieve blends thereof, and various processes of manufacture and use of these molecular sieve blends exist. Some preferred uses include production of oxygen from ambient air for medical, industrial and commercial purposes, dehydration of liquid and gaseous hydrocarbon streams, drying of cracked $C_1$-$C_4$ hydrocarbon gas streams, dehydration of ethanol, and removal of various undesired materials from various types of hydrocarbon feed streams. (For purpose of this disclosure "molecular sieve blends" may alternatively be referred to as "adsorbents", "adsorbent blends", "molecular sieve adsorbent blends" zeolite blends, adsorbent zeolite blends or "molecular sieve adsorbents" or such similar terms.)

Zeolites are hydrated metal alumino silicates having the general formula $$M_{2/n}O:Al_2O_3:xSiO_2:yH_2O$$

where M usually represents a metal, preferably of the alkali or alkaline earth group, n is the valence of the metal M, x varies from 2 to infinity, depending on the zeolite structural type and y designates the hydrated status of the zeolite.

Most zeolites are three-dimensional crystals with a crystal size in the range of 0.1 to 30 μm. Heating these zeolites to high temperatures results in the loss of the water of hydration, leaving a crystalline structure with channels of molecular dimensions, offering a high surface area for the adsorption of inorganic or organic molecules. Adsorption of particular molecules is dependent upon the size of these zeolite channels. The rate of adsorption is limited by the laws of diffusion.

Zeolites are used for a number of processes. The choice of the zeolite is important in a number of processes well known to those skilled in the art. Zeolites with and without binders are used for dehydration, adsorption of various compounds from feed streams and separation of various hydrocarbons from a feed stream. Various kinds of clays have been utilized to produce binderless molecular sieves.

Molecular sieves blends have also been advantageous for a number of processes as the diffusion of materials into and out of the pores can be facilitated based on the pore size that is present within the particular molecular sieve. (For purposes of this disclosure "zeolite" and "molecular sieve" have the same meaning.)

One limitation on the utilization of zeolites is their extremely fine particle size. Large, naturally-formed agglomerates of zeolite crystals break apart easily. In addition, because the pressure drop through a bed containing only such fine zeolite crystals is prohibitively high, these zeolite crystals are not used alone in fixed beds for various dynamic applications, such as production of oxygen for medical, commercial or industrial purposes, drying of natural gas, drying of air, separation of impurities from a gas stream, separation of some gaseous and liquid product streams and the like. Therefore, it is necessary to agglomerate these zeolite crystals with binder materials to provide an agglomerate mass containing the zeolite crystals, which exhibits a reduced pressure drop.

To overcome these issues and permit the utilization of zeolite crystals, different types of clays have conventionally been used as the binder materials with those crystals, wherein the clay utilized has generally been selected from attapulgite, palygorskite, kaolin, sepiolite, bentonite, montmorillonite, and mixtures thereof. Particularly useful clay binders have been formed using attapulgite clay.

For example, U.S. Pat. No. 2,973,327, discloses the use of a number of different types of clays, including attapulgite, as a binder for molecular sieves.

A particularly useful binder for the production of molecular sieve adsorbent blend products utilize an attapulgite binder comprising highly dispersed attapulgite fibers, as disclosed in U.S. Pat. No. 6,743,745 and U.S. Pat. No. 6,130,179.

Adsorbent materials comprising a type 5A zeolite molecular sieve and a kaolin clay binder, wherein the kaolin comprises from about 10 to about 40% of the composition, are disclosed in U.S. Pat. No. 5,001,098.

Examples of the use of halloysite clays with zeolites for odor remediation and dehumidification are disclosed in U.S. Pat. Nos. 5,667,650 and 5,512,083.

U.S. Pat. No. 6,410,815 discloses the use of halloysite clay as a binder for a zeolite for adsorbing and separating aromatics. However, the binder disclosed in is not present in the final product as it is zeolitized. Other uses of halloysite with zeolites for binderless adsorbents are disclosed in U.S. Pat. Nos. 8,283,274 and 8,859,448.

Halloysite clay is a member of the kaolin clay group. Conventional members of the kaolin clay group include kaolinite, dickite, nacrite, allophane and halloysite. See "Morphology and Structure of Endelite and Halloysite", *The American Mineralogist*, July-August 1950, pp 463-484. The chemical formulas for members of the kaolin clay group are similar comprising $(OH)_8Al_4Si_4O_{10}$, which may be hydrated, resulting in the presence of one or more hydroxyl groups. Chemical formulas for common members of the halloysite clay group include $(OH)_8Al_4Si_4O_{10}\cdot 4H_2O$, $(OH)_8Al_4Si_4O_{10}\cdot 2H_2O$ and $(OH)_8Al_4Si_4O_{10}$. To distinguish halloysite from the other members of the kaolin group, one reviews the physical structure of the clay particles. The most distinctive difference between members of the halloysite clay group and other members of the kaolin clay group is the physical structure thereof, wherein halloysite clay particles comprise hollow tubes, which may be in the form of cylindrical tubes or nanotubes or split tubes that have collapsed to form laths or ribbons, generally depending on hydration. In contrast, the structure of other members of the kaolin group is generally in the form of hexagonal plates. The structure of the respective members of the kaolin group can be identified using electron microscopy. For a discussion of the structure of halloysite particles and particles of other members of the kaolin group, see, for example, "The American Mineralogist"—Journal of the Mineralogical Society of America, Vol. 35, July-August 1950, Nos. 7 and 8, pp 476-481.

For purposes of this disclosure, "halloysite" includes all forms of the halloysite clay group and may be in the form of hollow tubes or nanotubes or may have collapsed or broken to form laths or ribbons. All such halloysite particles have a similar chemical structure that varies depending on hydration. "Halloysites" included within this disclosure are sometimes referred to as endellite (halloysite) and halloysite (matahalloysite) or simply halloysite.

One problem with many conventionally formed molecular sieve blends is decreased diffusion. It has been recognized that, generally, the larger the diameter of the zeolites, the slower the rate of diffusion of the molecules to be adsorbed. Particularly in the field of pressure swing adsorption, this effect is highly adverse to short cycle time and thus to productivity. Enhanced kinetic values or faster mass transfer rates can result in shorter cycle time and lower power consumption and thus higher adsorbent productivity.

Another important issue in choosing the composition of the molecular sieve blend is its ability to selectively adsorb a compound that is desired to be removed from the processing stream without also adsorbing the component or components of that stream that are not desired to be adsorbed. For example, an important feature of adsorbents used to remove water from an ethanol feed stream is not only their water adsorption capacity but also that the quantity of ethanol that is adsorbed by the adsorbents is limited. Frequently, it is necessary to balance the relative adsorption capabilities of adsorbent blends.

Accordingly, it is one intent to disclose a process for the production of molecular sieve blends using a predominately halloysite binder which blends are effective and highly selective for the production of oxygen for medical, industrial and commercial uses and for removal of water from hydrocarbon feed streams, such as those containing ethanol or cracked gases.

It is a still further intent to disclose molecular sieve blends using as a binder predominately halloysite which blends exhibit enhanced and predictable performance. By reducing the length of bed used ("LUB"), increasing breakthrough time, and increasing tapped bulk density while maintaining the capacity for adsorption and the necessary physical characteristics of the adsorbent, improved adsorbents are disclosed.

It is a still further intent to disclose a process for the production of oxygen for medical, industrial and commercial purposes comprising passing the feedstream over molecular sieve adsorbent blends comprising a zeolite and a halloysite clay binder.

It is a still further intent to disclose molecular sieve blends comprising a zeolite blended with a halloysite clay binder useful for the above described purposes which exhibits enhanced performance.

It is still further intent to disclose a process for production of medical, industrial or commercial oxygen from air, separation of components of a gaseous or liquid feed stream, particularly an ethanol feed stream or an air stream, comprising passing that gaseous or liquid feed stream over molecular sieve blends comprising a zeolite, alternatively a zeolite A or X, and a halloysite clay binder, wherein the binder comprises at least about 90% halloysite clay, alternatively at least about 95% halloysite clay by weight, and in a further alternative 98% halloysite clay.

These and other intents are obtained from the processes for production, the processes for use and the products of the various embodiments disclosed herein.

SUMMARY OF THE EMBODIMENTS

One embodiment is a molecular sieve blend comprising a zeolite, particularly a zeolite X or A, blended with a halloysite clay binder, and processes for the production and use of this blend.

An additional embodiment is molecular sieve blends comprising a zeolite, particularly a zeolite A or X, blended with a halloysite clay binder, wherein the halloysite clay binder comprises from about 0.5% to about 20% by weight of the molecular sieve blends, and processes for the production and use of these blends.

An additional embodiment is molecular sieve blends comprising a zeolite blended with a halloysite clay binder, wherein particles of the halloysite clay binder are in the form of hollow tubes or nanotubes with a length of less than 1 µm and aspect ratio (length to diameter) under 9.

An additional embodiment is a process for producing oxygen for medical, industrial or commercial purposes and for drying a gaseous or liquid hydrocarbon feed stream, such as an ethanol feed stream, comprising passing the feed stream over or through molecular sieve blends which comprise a zeolite, alternatively a zeolite A or X, blended with a halloysite clay binder, wherein the quantity of halloysite clay present in the binder comprises at least about 90%, by weight, alternatively at least about 95%, by weight, and further alternatively at least about 98%, by weight.

An additional embodiment for the process disclosed herein, uses a molecular sieve blend, which comprises a zeolite blended with a halloysite clay binder, wherein the halloysite clay binder has been highly dispersed.

Among those benefits and improvements that have been disclosed, other objects and advantages will become apparent from the following description taken in conjunction with the accompanying Figures. The Figures constitute a part of the specification and include exemplary embodiments and illustrate various objects and features thereof.

DETAILED DESCRIPTION OF ONE EMBODIMENT

One embodiment includes molecular sieve blends formed from a zeolite blended with a halloysite clay binder, uses of those blends, and processes for the production of these blends.

These embodiments are based on the surprising discovery that the adsorption rate and selectivity of molecular sieve blends are dependent not only upon the choice of the zeolite, but also the type and characteristics of the binder blended with the zeolite to form the molecular sieve blends.

It has been surprisingly discovered that the same type of zeolite, when blended with different types of binders, produces molecular sieve blends which exhibit surprisingly improved performance characteristics. (For purposes of this disclosure, the phrases "adsorption rate" or "absorption rate" or "sorption rate" or "mass transfer rate" mean the rate at which the adsorbate loading in a feed stream changes over a given period of time for a given adsorption process.)

It has been surprisingly discovered that the type of binder that is used in the molecular sieve blends may enhance particular characteristics of the molecular sieve blends, such as adsorption rate, tapped bulk density, LUB, and breakthrough of the zeolite blend.

The zeolites, as used for preparing the molecular sieve blends according to the embodiments, can be in many form. Preferably, the zeolites are in the form of crystals, crystal aggregates, or mixtures thereof. It is also possible to use a mixture of different types of zeolites for preparing the molecular sieve blends. Within the context of the present invention, the term "molecular sieve blend" refers to a blend of zeolites, binders and additional materials that can be formed into a shaped material suitable for the desired absorption processes.

The molecular sieve blends are preferably formed by preparing a mixture comprising one or more types of zeolite, and one or more types of binder material.

In one preferred embodiment, the molecular sieve blends are prepared by using a mixture comprising one or more types of zeolites, and one or more types of halloysite clay binders.

Different types of zeolites that can be used include, for example, zeolite A, zeolite X, zeolite Y, zeolite ZSM-5, zeolite Beta, synthetic mordenite and blends thereof, with zeolite A and zeolite X preferred. The ion-exchange of these zeolites can vary, but generally utilizes alkali and/or alkaline earth metals. The zeolites, as used for preparing the molecular sieve blends, have a crystal size, preferably in a range from 0.1 to 30 µm.

Particularly effective zeolites that are useful for oxygen production for medical, commercial or industrial uses, removal of water from an ethanol:water mixture, and for the drying of cracked hydrocarbons are zeolite 3A or 4A. Zeolite 3A is particularly effective for the adsorption of water because of the size of the pore openings in this zeolite. It permits the passage of water molecules but restricts the passage of larger hydrocarbon molecules, such as ethanol. While zeolite 3A is an especially useful zeolite for this process and related processes, other zeolites may also be used for other processes, such as the use of zeolite 5A for iso/normal paraffin separation.

In one embodiment, the zeolite chosen is a low silica zeolite with a ratio of $SiO_2:Al_2O_3$ less than 50, alternatively less than 20, alternatively less than 10, alternatively less than 5, and as low as 1. It is thus useful to reduce the $SiO_2:Al_2O_3$ ratio of these zeolites. Processes for the production of low silica zeolites are well known. Low silica zeolites are more effective as adsorbents of water from hydrocarbon/water mixtures than are high silica zeolites, which are commonly used, for example, for catalytic reactions. (Zeolite blends useful for catalytic reactions are not embodiments that are included in the disclosures herein. Further, the molecular sieve blends of this disclosure are not conventionally utilized for these catalytic reactions.)

Binder materials are necessary for use with these zeolites to bind the individual zeolite crystals together to form shaped products to reduce the pressure drop during the adsorption process. However, in the past, the binder materials have not enhanced the adsorption capability and selectivity of the zeolite. Binder materials which have been utilized with zeolites in the past generally include conventional clay types, such as kaolin, palygorskite-type minerals, particularly attapulgite, and smectite-type clay minerals, such as montmorillonite or bentonite. These clay binders have been used singly or in mixtures of two or more different types of clay binders.

These clay binders, particularly attapulgites, often have a high metal content. Such metals can cause carbon polymerization to occur at the acid sites on the clay binders during utilization in some of the processes disclosed herein. This often results in the production of coke and green oil, resulting in a shortened life span for the molecular sieve blend. Such prior art zeolite/clay binder agglomerate materials, when used for adsorption or separation processes often exhibit a high incidence of coking in the presence of unsaturated hydrocarbons. One advantage of the molecular sieve blend disclosed herein is a reduction in the polymerization of hydrocarbons and a reduction in the production of coke and green oil and thus, an increase in the life expectancy of the molecular sieve blends.

It has been surprisingly discovered that improved performance from the molecular sieve blends can be achieved when the binder material that is used comprises a halloysite clay. In one embodiment, the molecular sieve blend comprises a low silica zeolite with a ratio of $SiO_2:Al_2O_3$, as defined herein, and a binder comprising halloysite clay.

It has been surprisingly discovered that molecular sieve blends produced using halloysite clay as a binder produce better performing adsorbents than traditional adsorbents, wherein the zeolite is bound using a conventional clay binder, such as an attapulgite.

It has also been surprisingly discovered that molecular sieve blends using halloysite clay as binders have better performance as shown by various adsorption characteristics, such as tapped bulk density, breakthrough time, length of unused bed (LUB), and pore distribution coefficient. Comparisons of the performance of molecular sieve blends utilizing a halloysite clay binder with molecular sieve blends utilizing conventional attapulgite binders are shown in various Figures within this specification.

Halloysite clay is a member of the kaolin clay group. While the chemical formula for all members of the kaolin clay group is similar, the structure of halloysite clay, in the form of hollow tubes, nanotubes or split tubes in the form of ribbons or laths, differentiate it from other members of the kaolin clay group. The halloysite clay may be in hydrated form, which normally exhibits a shape of a hollow tube or nanotube or a non-hydrated halloysite clay which may be in the form of a broken or split tube, laths or ribbons. It has been surprisingly discovered that all forms of halloysite clay show improved performance as a binder with zeolite clays and improve various adsorption characteristics of the blend over conventional molecular sieve blends. While hydrated forms of the halloysite clay group are preferred for use as the binder, all forms of the halloysite clay included within the definition of "halloysite" herein are useful as a binder.

The performance of molecular sieve blends produced using halloysite clay as a binder and a zeolite was surprising because halloysite clay is high in bulk density. Given its porosity profile, especially its lower total porosity with a higher amount of relatively small pores, it was anticipated that a molecular sieve blend containing halloysite clay as a binder would have an earlier water breakthrough time, as well as much lower LUB. In fact, it was surprisingly discovered that the LUB was substantially reduced by as much as about 70%, which, in conjunction with the higher volumetric loading potential of the material, led to an increased breakthrough time of at least 20% and often as much as 30 to 50%. These values are especially important for specific applications of the molecular sieve blends disclosed herein. See, for example, FIGS. 1 and 3.

It has also been discovered that in applications of the disclosed composition where smaller quantities of the halloysite clay are used, i.e. from about 0.5 to about 10%, it is useful that the halloysite clay be dispersed using dispersion processes disclosed, for example, by U.S. Pat. Nos. 6,918,948 and 6,130,179. When such dispersion occurs, the median particle size of the dispersed halloysite clay particles has a range from about 0.5 to about 1.5 microns, $d^{50}$, with a ratio of $d^{90}/d^{10}$ approaching 1.

It has also been surprisingly discovered that when higher quantities of the halloysite clay are used as the binder, i.e. in ranges above about 10 to 20% or greater, it may not be necessary to disperse the halloysite clay to the same extent as when lower percentages are used.

It has also been surprisingly discovered that particle size and shape of the halloysite clay particles have an impact on the performance of the halloysite binder utilized in the disclosed molecular sieve blends. The length of halloysite binder particles is generally from about 0.5 μm to 2.0 μm with a diameter of 50 nm to 100 nm or so. It has been surprisingly discovered that improved performance for molecular sieve blends utilizing halloysite clay as the binder occurs when the average particle length is less than 1 micron, alternatively less than 0.9 micron and further alternatively less than 0.8 micron. Further, molecular sieve blends utilizing a halloysite binder wherein the halloysite particles have an aspect ratio (ratio of length to diameter) less than 10, alternatively less than 9, have shown improved performance over molecular sieve blends using the same quantity of halloysite binder wherein the aspect ratio is greater than 10 and/or the average particle length is greater than 1 μm.

Regardless of the extent of dispersion or particle size and aspect ratio, an important requirement of the content of the binder is that it contains predominately halloysite clay in quantities greater than 90%, alternatively greater than 95%, and also alternatively greater than 98% halloysite clay. Halloysite clay when mined often is present in blends, particularly with kaolinite clay. However, it has been surprisingly discovered that the quantity of kaolinite, or other non-halloysite clay, with the halloysite, should be reduced to less than 10%, alternatively less than 5%, alternatively less than 2%, as larger quantities of kaolinite (or other clay materials), when blended with the halloysite clay, may bind the particles of halloysite clay together producing a less efficient molecular sieve blend.

Once the appropriate zeolite material is chosen for a given application, such as a low silica zeolite A or zeolite X, alternatively a zeolite 3A or 4A, it is mixed with a halloysite clay binder in the presence of water. The zeolite powder and the halloysite clay binder are then blended together using conventional mixing procedures.

Certain pore forming agents, such as saw dust fibers, such as rayon, sisal, nylon, flax and the like and organic polymer, such as corn starch, cellulose derivatives and the like may also be added to the blend, but are not required elements of the disclosed molecular sieve blends. If used, the amount added is generally form about 2 to 15 percent, by weight.

Once the formed products are produced in the appropriate shape, they are hydrothermally treated (or calcined) at conventional temperatures to reduce the pore openings to a size that excludes the desired material, such as ethanol, but retains the capacity to adsorb water from a feed stream.

The molecular sieve blends exhibit a preferred pore structure. An analysis of this pore structure can be determined using mercury porismetry. Using data from analysis by mercury porismetry, the total particle porosity, medium pore diameter, volume of pores between 0.1 and 1.0 μm, and pore distribution coefficient can be determined. Examples of the improvements disclosed herein are shown by the following examples:

EXAMPLES

Samples of molecular sieve adsorbent, agglomerate blends were prepared and compared for performance. The inventive examples (Inventive Examples 2 and 4) contained 20% of a halloysite clay blended with approximately 80% of a conventional 3A zeolite (Inventive Example 2) or a 4A zeolite (Inventive Example 4). The comparative examples (Comparative Examples 1 and 3) contained 20% of an attapulgite clay blended with approximately 80% of a conventional 3A zeolite (Comparative Example 1) or a 4A zeolite (Comparative Example 3). The attapulgite clay was obtained from ITC Floridin. The halloysite and zeolites were obtained from conventional sources. The halloysite was essentially pure halloysite. Four samples of about 10 grams of the molecular sieve blends were prepared using conventional procedures.

Figure 1:
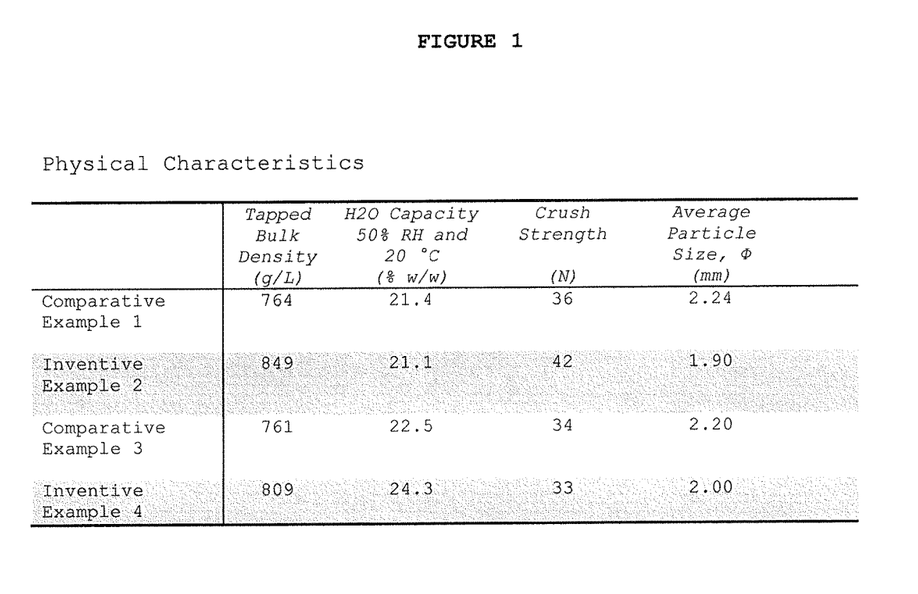
FIG. 1 compares physical characteristics of various molecular sieve blend examples. Inventive Examples contain as a binder, halloysite clay, and either zeolite 3A (Inventive Example 2) or zeolite 4A (Inventive Example 4). Comparative Examples contain a conventional attapulgite binder and zeolite 3A or 4A. (Comparative Examples 1 and 3).

FIG. 1.

FIG. 1 compared physical characteristics of the four examples. Note that the Inventive Examples show better performance for tapped bulk density while maintaining the $H_2O$ capacity and crush strength.

Figure 2:
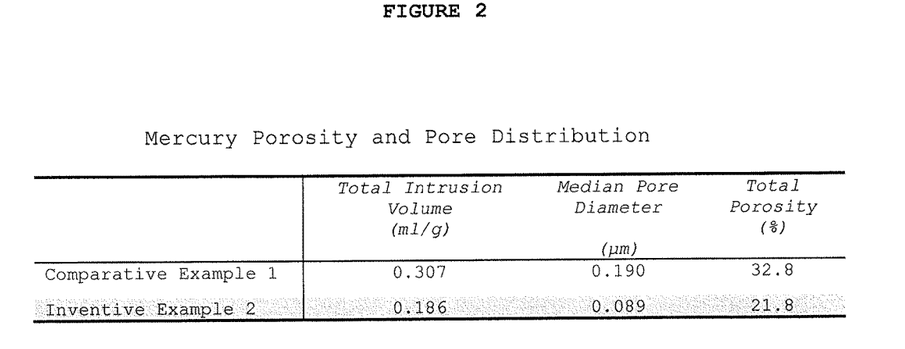
FIG. 2 compares the mercury porosity and pore distribution between Comparative Example 1 and Inventive Example 2.

FIG. 2.

The mercury porosity and pore distribution of the examples are shown in FIG. 2. Note the median pore diameter and total porosity of Inventive Example 2 in comparison with that of Comparative Example 1.

Figure 3:
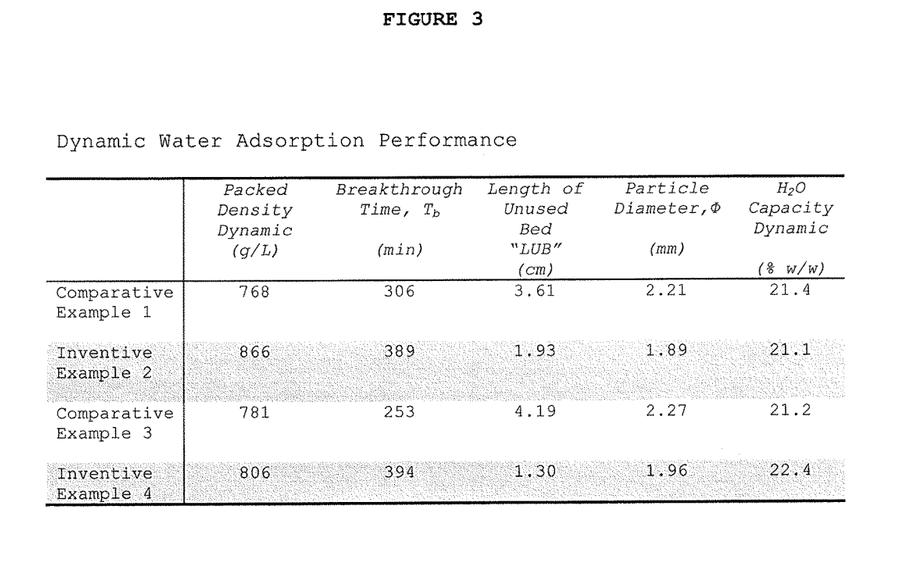
FIG. 3 compares the dynamic water adsorption performance of Comparative Examples 1 and 3 with Inventive Examples 2 and 4.

FIG. 3.

The water adsorption performance of Inventive Examples 2 and 4 was compared with that of Comparative Examples 1 and 3. Note the superior performance for the Inventive Examples for packed density dynamic, breakthrough time, and length of unused bed (LUB), while maintaining similar water capacity dynamic.

Figure 4:
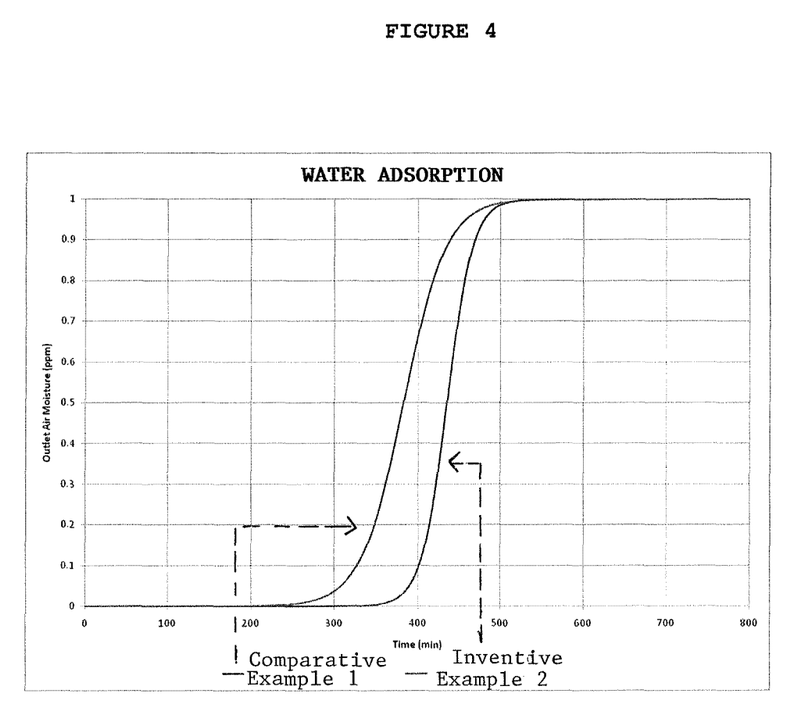
FIG. 4 compares the water adsorption performance of Comparative Example 3 with Inventive Example 4 over various adsorption times.

FIG. 4.

FIG. 4 compared the performance of Comparative Example 1 with Inventive Example 2 for water adsorption. Note the superior performance of Inventive Example 2 with regard to water adsorption.

Figure 5:
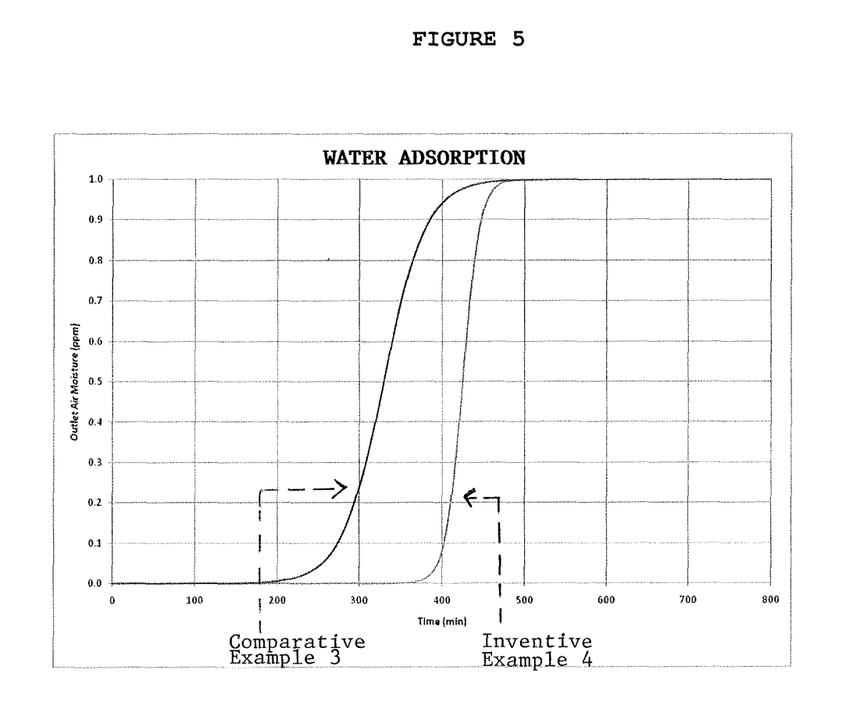
FIG. 5 compares water performance adsorption curves for Comparative Example 1 with Inventive Example 2 over various adsorption times.

FIG. 5.

FIG. 5 compares the performance of Comparative Example 3 with Inventive Example 4 for water adsorption over time. Note the superior performance of Inventive Example 4 over time.

Although the invention has been described in detail, it is clearly understood that the disclosure is not to be taken as any limitation on the invention.

The invention claimed is:

1. A molecular sieve blend used for adsorption comprising
a zeolite; and
a halloysite clay binder;
   wherein the halloysite clay binder present in the molecular sieve blend comprises from about 0.5% to about 20% of the blend, by weight, and
   wherein the average particle length of particles of the halloysite clay binder is less than 1 μm.

2. The molecular sieve blend of claim 1 wherein the zeolite comprises zeolite A or zeolite X.

3. The molecular sieve blend of claim 1, wherein it has a median pore diameter of at least 0.25 μm and less than about 1.5 μm.

4. The molecular sieve blend of claim 1, wherein the aspect ratio of the halloysite particles is less than 9.

5. The molecular sieve blend of claim 1 wherein the halloysite clay binder comprises at least about 90% halloysite clay.

6. The molecular sieve blend of claim 1 wherein the halloysite clay binder comprises at least 95% halloysite clay.

7. The molecular sieve blend of claim 1 wherein the halloysite clay binder comprises from about 0.5 to about 10%, by weight, of the molecular sieve blend.

8. A molecular sieve blend used for production of oxygen for medical, industrial or commercial purposes comprising
a zeolite; and
a halloysite clay binder;
wherein the halloysite clay binder present in the molecular sieve blend comprises from about 0.5% to about 20% of the blend by weight, and
wherein the average particle length of particles of the halloysite clay binder is less than 1 μm.

9. The molecular sieve blend of claim 8 wherein the zeolite comprises zeolite A or zeolite X.

10. The molecular sieve blend of claim 8, wherein it has a median pore diameter of at least 0.25 μm and less than about 1.5 μm.

11. The molecular sieve blend of claim 8, wherein the aspect ratio of the halloysite particles is less than 9.

12. The molecular sieve blend of claim 8 wherein the halloysite clay binder blend comprises at least about 90% halloysite clay.

13. The molecular sieve blend of claim 8 wherein the halloysite clay binder comprises at least 95% halloysite clay.

14. The molecular sieve blend of claim 8 wherein the halloysite clay binder comprises from about 0.5 to about 10%, by weight, of the molecular sieve blend.

15. A molecular sieve blend used for dehydration of a gaseous or liquid hydrocarbon feed stream comprising
a zeolite A; and
a halloysite clay binder;
wherein the amount of halloysite clay binder blend present in the molecular sieve blend comprises from about 0.5% to about 20%, by weight;
wherein the halloysite clay binder comprises at least about 90% halloysite clay; and
wherein the average particle length of particles of halloysite clay binder is less than 1 μm.

16. The molecular sieve blend of claim 15, wherein it has a median pore diameter of at least 0.25 μm and less than about 1.5 μm.

17. The molecular sieve blend of claim 15, wherein the aspect ratio of the halloysite particles is less than 9.

18. The molecular sieve blend of claim 15 wherein the halloysite clay binder comprises from about 0.5 to about 10%, by weight, of the molecular sieve blend.

* * * * *